United States Patent
Larose, Jr. et al.

(10) Patent No.: US 9,291,084 B2
(45) Date of Patent: Mar. 22, 2016

(54) VEHICLE AND A METHOD OF UPDATING EFFICIENCY OF A SELECTIVE CATALYTIC REDUCTION FILTER OF AN EXHAUST TREATMENT SYSTEM OF THE VEHICLE

(71) Applicant: GM GLOBAL TECHNOLOGY OPERATIONS LLC, Detroit, MI (US)

(72) Inventors: Thomas Larose, Jr., Howell, MI (US); Christopher C. Swoish, Lapeer, MI (US); Christopher Whitt, Howell, MI (US); Joshua Clifford Bedford, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 13/967,737

(22) Filed: Aug. 15, 2013

(65) Prior Publication Data
US 2015/0047328 A1 Feb. 19, 2015

(51) Int. Cl.
*F01N 3/00* (2006.01)
*F01N 11/00* (2006.01)
*F01N 3/035* (2006.01)
*F01N 3/20* (2006.01)

(52) U.S. Cl.
CPC .............. *F01N 11/00* (2013.01); *F01N 3/035* (2013.01); *F01N 3/208* (2013.01); *F01N 11/002* (2013.01); *F01N 2610/02* (2013.01); *F01N 2900/1606* (2013.01); *F01N 2900/1621* (2013.01)

(58) Field of Classification Search
CPC ... F02D 41/029; F02D 41/0275; F01N 9/002; F01N 3/0842; F01N 3/035; F01N 3/0814; F01N 3/2066; F01N 13/02
USPC .................... 60/273, 274, 295, 297, 301, 311
See application file for complete search history.

(56) References Cited

U.S. PATENT DOCUMENTS

| | | | |
|---|---|---|---|
| 7,758,676 B2 | 7/2010 | Mital et al. | |
| 8,141,340 B2 | 3/2012 | Garimella et al. | |
| 8,333,062 B2 | 12/2012 | Sun | |
| 8,904,757 B2 | 12/2014 | Sarsen et al. | |
| 2007/0144152 A1* | 6/2007 | Lueders | 60/286 |
| 2008/0295482 A1* | 12/2008 | Gonze et al. | 60/273 |
| 2010/0326052 A1* | 12/2010 | Sun | 60/274 |
| 2014/0056788 A1* | 2/2014 | Breitschaedel et al. | 423/212 |
| 2014/0147355 A1* | 5/2014 | Fritsch et al. | 423/212 |

FOREIGN PATENT DOCUMENTS

| | | |
|---|---|---|
| DE | 10349126 A1 | 6/2004 |
| DE | 102011087082 A1 | 5/2013 |
| EP | 2749745 A1 | 7/2014 |
| FR | 2986036 A1 | 7/2013 |
| FR | 2700793 A1 * | 2/2014 |
| KR | 2009118733 A * | 11/2009 |
| KR | 1020130058449 A | 6/2013 |

* cited by examiner

*Primary Examiner* — Patrick Maines
(74) *Attorney, Agent, or Firm* — Quinn Law Group, PLLC

(57) ABSTRACT

A vehicle and a method of updating efficiency of a selective catalytic reduction filter (SCRF) of an exhaust treatment system of the vehicle are disclosed. The method includes obtaining an initial calculated efficiency of the SCRF, via a controller, regarding one of a NOx conversion, a reductant absorption, a reductant desorption and a reductant oxidation. The method also includes determining a soot mass estimate in the SCRF representative of an amount of soot collected inside the SCRF and determining a soot correction factor from the soot mass estimate. The method further includes calculating, via the controller, an updated efficiency value of the SCRF by multiplying the soot correction factor and the initial calculated efficiency to update efficiency of the SCRF.

20 Claims, 2 Drawing Sheets

US 9,291,084 B2

VEHICLE AND A METHOD OF UPDATING EFFICIENCY OF A SELECTIVE CATALYTIC REDUCTION FILTER OF AN EXHAUST TREATMENT SYSTEM OF THE VEHICLE

TECHNICAL FIELD

The present disclosure relates to a vehicle and a method of updating efficiency of a selective catalytic reduction filter of an exhaust treatment system of the vehicle.

BACKGROUND

Internal combustion engines can produce byproducts of the fuel combustion process, including various oxides of nitrogen, referred to collectively herein as NOx gases. Exhaust gas treatment systems can be used in vehicles to treat the NOx gases created in the combustion process.

Exhaust gas treatment systems generally include a selective catalytic reduction (SCR) device to reduce NOx gases. The SCR device uses a reductant capable of reacting with NOx gases to convert the NOx gases into inert byproducts, i.e., nitrogen and water. For example, the reductant can be an aqueous solution of urea, which is injected into the engine's exhaust stream. Once the reductant is in the exhaust stream, the reductant is absorbed into a catalyst of the SCR device, where the catalytic action of the SCR device ultimately converts NOx gases into the inert byproducts.

Exhaust gas treatment systems also include a diesel particulate filter (DPF) to filter out particles or particulate matter in the exhaust stream that is emitted by the engine. Generally, the DPF captures or traps sooty particulate matter and other suspended particulate matter from the exhaust stream. For example, the particulate matter can include carbonaceous soot particulates that can be oxidized to produce gaseous carbon dioxide, as well as other non-combustible particulates (i.e., ash) that are not capable of being oxidized.

Generally, the SCR device is spaced from the DPF such that the SCR device and the DPF are separate and independent components. Therefore, the SCR device converts NOx gases into the inert byproducts independently of the particulate matter being trapped by the DPF.

In-situ thermal regeneration of the DPF can be conducted periodically to burn off the accumulated particulate matter. However, thermal regeneration cannot remove ash from the DPF, and therefore, ash continues to accumulate in the DPF throughout the life of the DPF.

SUMMARY

The present disclosure provides a method of updating efficiency of a selective catalytic reduction filter (SCRF) of an exhaust treatment system of a vehicle. The method includes obtaining an initial calculated efficiency of the SCRF, via a controller, regarding one of a NOx conversion, a reductant absorption, a reductant desorption and a reductant oxidation. The method also includes determining a soot mass estimate in the SCRF representative of an amount of soot collected inside the SCRF and determining a soot correction factor from the soot mass estimate. The method further includes calculating, via the controller, an updated efficiency value of the SCRF by multiplying the soot correction factor and the initial calculated efficiency to update efficiency of the SCRF.

The present disclosure also provides a vehicle including an engine that generates an exhaust stream during operation and an exhaust treatment system coupled to the engine. The exhaust treatment system includes a selective catalytic reduction filter (SCRF) to catalytically convert constituents in the exhaust stream into inert byproducts and to filter particulate matter from the exhaust stream. The exhaust treatment system further includes a controller in communication with the SCRF, with the controller including a processor and a memory having recorded instructions for updating efficiency of the SCRF of the exhaust treatment system. The controller is configured to obtain an initial calculated efficiency of the SCRF regarding one of a NOx conversion, a reductant absorption, a reductant desorption and a reductant oxidation. The controller is also configured to determine a soot mass estimate in the SCRF representative of an amount of soot collected inside the SCRF and determine a soot correction factor from the soot mass estimate. The controller is further configured to calculate, via a controller, an updated efficiency value of the SCRF by multiplying the soot correction factor and the initial calculated efficiency to update efficiency of the SCRF.

Therefore, various particulate matter, such as soot is taken into consideration to determine the updated efficiency of the SCRF, and thus, optimize the exhaust treatment system. By accounting for various particulate matter in the SCRF, various models can be more accurately calibrated to maximize NOx reduction efficiencies and minimize expelling the reductant out of the SCRF. Furthermore, accounting for various particulate matter in the SCRF can optimize emissions, diagnostics, reductant consumption and fuel economy of the vehicle. Additionally, reductant consumption can be more accurately calibrated.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Figure 1:
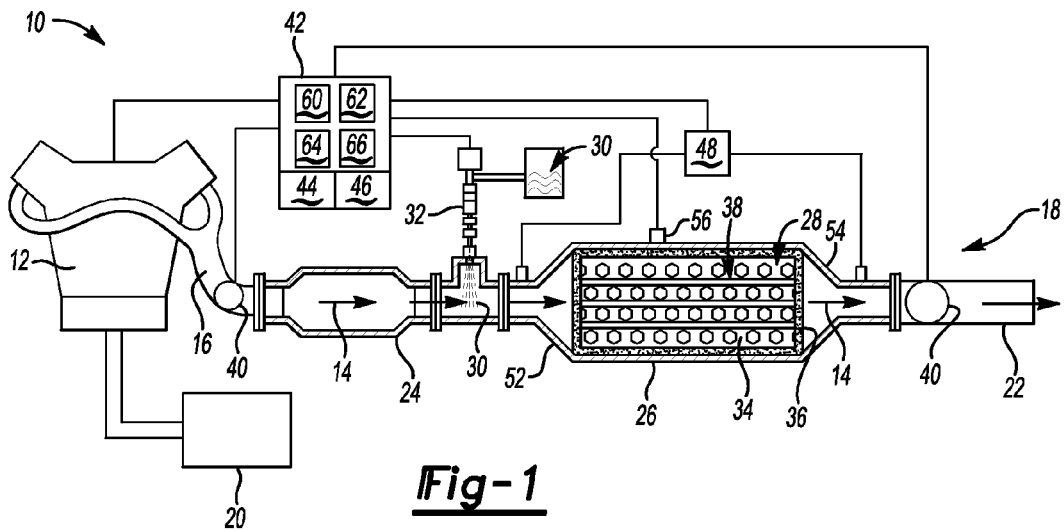
FIG. 1 is a schematic illustration of a vehicle including an engine and an exhaust treatment system.

Referring to the Figures, wherein like numerals indicate like or corresponding parts throughout the several views, a vehicle 10 is generally shown in FIG. 1. The vehicle 10 includes an engine 12 that generates an exhaust stream 14 (arrow 14) during operation. The engine 12 can be an internal combustion engine such as a diesel engine or any other engine that emits gases, such as oxides of nitrogen (NOx), i.e., NOx gases, into the exhaust stream 14. An exhaust gas tube 16 is coupled to the engine 12 and receives the exhaust gas from the engine 12 such that the exhaust stream 14 moves through the exhaust gas tube 16. While a diesel engine application is described hereinafter for illustrative purposes only, those skilled in the art will appreciate that a similar approach can be taken with other engine 12 designs.

The vehicle 10 includes an exhaust treatment system 18 coupled to the engine 12. The exhaust treatment system 18 treats various constituents in the exhaust gas such as NOx gases. In other words, the exhaust treatment system 18 treats various emissions contained in the exhaust stream 14 expelled from the engine 12.

As shown in FIG. 1, the vehicle 10 includes a tank 20 for storing fuel, such as, for example, diesel fuel. The diesel fuel is drawn from the tank 20 and combusted in the engine 12 which generates the exhaust stream 14, and the exhaust stream 14 is then processed through the exhaust treatment system 18 before being expelled from a tailpipe 22.

The exhaust system 18 includes a series of exhaust after-treatment devices 24, 26, shown in FIG. 1 as an oxidation catalyst 24, such as a diesel oxidation catalyst 24 (DOC), and a selective catalyst reduction filter 26 (SCRF) which are each discussed in detail below.

Accordingly, the exhaust gas tube 16 directs the exhaust gas stream 14 from the engine 12 through the series of exhaust after-treatment devices 24, 26. Depending on the embodiment, the after-treatment devices 24, 26 of the exhaust system 18 can be arranged in other orders than shown in FIG. 1. Collectively, the DOC 24 and the SCRF 26 condition the exhaust stream 14.

As discussed above, the exhaust after-treatment devices 24, 26 are utilized to reduce various exhaust emissions of the engine 12. For example, the DOC 24 receives the exhaust gas stream 14 from the engine 12 to oxidize and burn hydrocarbon emissions present in the exhaust stream 14. The DOC 24 is in communication with a fuel injection device that delivers a calibrated amount of fuel into the DOC 24. Ignition of the injected fuel rapidly increases the temperature of the exhaust stream 14, generally 600° C. (Celsius) or higher, in order to enable a thermal regeneration of the SCRF 26.

In one example, following the DOC 24, the exhaust stream 14 is routed to the SCRF 26. In other words, the SCRF 26 is disposed downstream to the DOC 24. Generally, the SCRF 26 catalytically converts constituents in the exhaust stream 14 into inert byproducts and filters particulate matter from the exhaust stream 14. In other words, the SCRF 26 treats various emissions contained in the exhaust stream 14 and also filters particulate matter, such as soot and ash, from the exhaust stream 14. Therefore, generally, the SCRF 26 performs multiple functions, such as, treating NOx gases and filtering soot and ash from the exhaust stream 14 (each of which are discussed in turn below). Simply stated, SCRF 26 is utilized to reduce NOx emissions and particulate matter expelled from the engine 12 powering the vehicle 10.

Continuing with FIG. 1, the SCRF 26 includes an active catalytic component 28, referred to herein as a catalyst 28. The catalyst 28 can be an oxide of a base metal such as vanadium, molybdenum, tungsten and zeolite. A reductant 30 is utilized to convert NOx gases into inert byproducts. As such, the SCRF 26 is converting NOx gases with the aid of the catalyst 28 into inert byproducts, i.e., diatomic nitrogen $N_2$, and water $H_2O$. The reductant 30 can be an anhydrous ammonia, aqueous ammonia, ammonia precursors, aqueous solution of urea or any other suitable reductant 30, which is added to the exhaust stream 14 and absorbed in the SCRF 26. An injector 32 (see FIG. 1) or any other suitable device can be utilized to add the reductant 30 to the exhaust stream 14.

Exhaust emissions of both gasoline engines 12 and diesel engines 12 can be optimized by utilizing the SCRF 26. For the diesel engine 12 embodiment, the reductant 30 can be a diesel-exhaust-fluid (DEF) that is used in SCRF 26. Accordingly, the DEF is disposed on the catalyst 28 of the SCRF 26 as the exhaust gas stream 14 flows through SCRF 26.

Referring to FIG. 1, the SCRF 26 can include a carrier or substrate 34 that is dipped into a washcoat 36 containing the active catalytic component 28, i.e., the catalyst 28. Generally, the washcoat 36 is applied to or coated on a surface of the substrate 34 for absorbing the reductant 30. More specifically, the substrate 34 is porous and the washcoat 36 is applied or coated on the surface of the substrate 34 within the pores. The substrate 34 can be a ceramic brick or a ceramic honeycomb structure, a plate structure, or any other suitable structure. In other words, the washcoat 36 can be applied to the surface of the pores of ceramic brick. For example, the substrate 34 can be formed of silicon carbide (SiC), cordierite or any other suitable substrate being highly porous. The washcoat 36 attracts the reductant 30 to deposit the reductant 30 in the SCRF 26. In other words, the reductant 30 is disposed on the washcoat 36 inside the SCRF 26. As the exhaust stream 14 passes through the SCRF 26, the reductant 30 interacts with the exhaust gas stream 14 to generate a chemical reaction which reduces NOx gases passing through the exhaust system 18.

As the exhaust gas stream 14 passes through the SCRF 26, the particulate matter emitted from the engine 12 is collected in the SCRF 26. Therefore, the SCRF 26 can include a filter 38 (see FIG. 1) for collecting the particulate matter. As such, for example, the filter 38 of the SCRF 26 collects sooty particulate matter during a soot loading phase and disposes of the sooty particulate matter through the regeneration process. Generally, carbonaceous soot particulates can be oxidized during the regeneration process to produce gaseous carbon dioxide. The efficiency of the SCRF 26 can be degraded due to an amount of soot accumulated on the SCRF 26, during the soot loading phase leading up to the regeneration process. In other words, the combustible particulate matter, such as soot, can build on the surface of the SCRF 26 which can degrade the efficiency of the SCRF 26. In-situ thermal regeneration of the SCRF 26 can be conducted periodically to burn off accumulated sooty particulate matter. In other words, when a predetermined amount of soot builds inside the SCRF 26, thermal regeneration can be conducted to remove the soot from inside the SCRF 26. Therefore, over the life of the SCRF 26, many thermal regenerations can be performed to the SCRF 26 to periodically remove soot.

Furthermore, as the exhaust gas stream 14 passes through the SCRF 26, the SCRF 26 collects other non-combustible particulates (i.e., ash) emitted from the engine 12. In other words, the filter 38 of the SCRF 26 collects particulate matter such as ash. For example, ash can form as a result of oil being burned during the engine combustion process. However, the other non-combustible particulates, such as ash, are not capable of being oxidized during the regeneration process. Therefore, ash accumulates inside the SCRF 26 after each thermal regeneration removing soot. Specifically, ash continues to accumulate in the filter 38 of the SCRF 26 throughout the life of the SCRF 26. In other words, ash cannot be removed from the SCRF 26 unless the SCRF 26 is removed from the vehicle 10. Therefore, ash builds inside of the SCRF 26 throughout the life of the SCRF 26. As the ash builds inside the filter 38, the ash can accumulate on the surface of the substrate 34, thus reducing the area of the washcoat 36 to react with the reductant 30. Therefore, the efficiency of the SCRF 26 can be degraded due to an amount of ash accumulation on the SCRF 26. In other words, ash can build inside the SCRF 26 which can degrade the efficiency of the SCRF 26.

Continuing with FIG. 1, the exhaust system 18 can further include at least one NOx sensor 40. In one embodiment, the NOx sensor 40 can be positioned upstream to the SCRF 26. For example, the NOx sensor 40 can be positioned upstream to the DOC 24 and the SCRF 26 such that the NOx sensor 40 is disposed between the engine 12 and the DOC 24. As another example, the NOx sensor 40 can be positioned upstream to the SCRF 26 such that the NOx sensor 40 is disposed between the DOC 24 and the SCRF 26. In another embodiment, the NOx sensor 40 can be positioned downstream to the SCRF 26. For example, the NOx sensor 40 can be positioned between the SCRF 26 and the tailpipe 22. In another embodiment, the NOx sensor 40 can be defined as a plurality of NOx sensors 40, with one of the NOx sensors 40 positioned upstream to the DOC 24 and another one of the NOx sensors 40 positioned downstream to the SCRF 26. Structurally and functionally, the NOx sensors 40 can be different or identical.

The exhaust system 18 can further include a controller 42 (see FIG. 1) in communication with various components of the vehicle 10. For example, the controller 42 is in communication with the SCRF 26. As another example, the controller 42 can be in communication with each of the NOx sensors 40. Therefore, the NOx sensors 40 can send or communicate NOx level measurements to the controller 42. The controller 42 can be a stand-alone unit, or be part of an electronic controller 42 that regulates the operation of the engine 12. The controller 42 can include a processor 44 and a memory 46 having recorded instructions for updating efficiency of the SCRF 26 of the exhaust treatment system 18, as discussed further below. For example, the controller 42 can be a host machine or distributed system, e.g., a computer such as a digital computer or microcomputer, acting as a vehicle control module, and/or as a proportional-integral-derivative (PID) controller device having a processor, and tangible, non-transitory memory such as read-only memory (ROM) or flash memory. The controller 42 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 42 can include all software, hardware, memory 46, algorithms, connections, sensors, etc., necessary to monitor and control the exhaust treatment system 18 and the engine 12. As such, a control method operative to evaluate and update the efficiency of the SCRF 26 can be embodied as software or firmware associated with the controller 42. Furthermore, the control method operative to evaluate and initiate a regeneration can be embodied as software or firmware associated with the controller 42. It is to be appreciated that the controller 42 can also include any device capable of analyzing data from various sensors, comparing data, making the necessary decisions required to control and monitor the exhaust treatment system 18.

Furthermore, the exhaust system 18 can include a particulate filter sensor 48 (see FIG. 1) that measures the differential pressure across the SCRF 26. In other words, the particulate filter sensor 48 can measure a pressure difference 50 (see FIGS. 3-6) in the SCRF 26. Generally, the controller 42 can be in communication with the particulate filter sensor 48. Therefore, the particulate filter sensor 48 can send or communicate the pressure difference 50 across the SCRF 26. The particulate filter sensor 48 measures and calculates the pressure difference 50 between an inlet side 52 and an outlet side 54 of the SCRF 26. The particulate filter sensor 48 can be a unitary sensor or gauge connected to the SCRF 26. Alternatively, the particulate filter sensor 48 can be embodied as a pair of pressure taps that individually read the inlet and outlet pressures, and then calculates the pressure difference 50 across the SCRF 26. The particulate filter sensor 48 can return a resultant pressure measurement to the controller 42.

Additionally, the exhaust system 18 can include a temperature sensor 56 (see FIG. 1) that measures a temperature 58 (see FIGS. 3-6) of the substrate 34 of the SCRF 26. Generally, the controller 42 can be in communication with the temperature sensor 56. Therefore, the temperature sensor 56 can send or communicate the temperature 58 of the substrate 34 to the controller 42. It is to be appreciated that more than one temperature sensor 56 can be utilized with the exhaust system 18.

After the exhaust gas stream 14 exits the SCRF 26, the exhaust stream 14 passes through the tailpipe 22. In other words, the tailpipe 22 is disposed downstream of the SCRF 26. In one embodiment, the SCRF 26 is disposed between the DOC 24 and the tailpipe 22.

Various inputs can be communicated to and from the controller 42. These inputs can be inputted into one or more models 60, 62, 64, 66 within the controller 42. For example, the controller 42 can store one or more of a NOx model 60, an absorption model 62, a desorption model 64 and an oxidation model 66. The NOx model 60 stores information regarding the SCRF 26 catalytically converting constituents in the exhaust stream 14 into inert byproducts. The absorption model 62 stores information regarding absorption of the reductant 30 on the substrate 34 of the SCRF 26. The desorption model 64 stores information regarding desorption of the reductant 30 through the SCRF 26. The oxidation model 66 stores information regarding the oxidizing of the reductant 30 through the SCRF 26. Therefore, various information or inputs are relayed to the controller 42 which can be utilized for the NOx model 60, the absorption model 62, the desorption model 64 and the oxidation model 66. As ash and soot collects inside the SCRF 26, the area of the surface (of the substrate 34) presenting the catalyst 28 that absorbs the reductant 30 is reduced. In other words, as the ash and soot collects inside the SCRF 26, some of the washcoat 36 (including the catalyst 28) is covered by the ash/soot which decreases the area of the washcoat 36 being able to absorb the reductant 30. Accordingly, the models 60, 62, 64, 66 capture and account for ash/soot accumulation inside the SCRF 26. As such, various efficiencies can be updated utilizing the controller 42.

Figure 2:
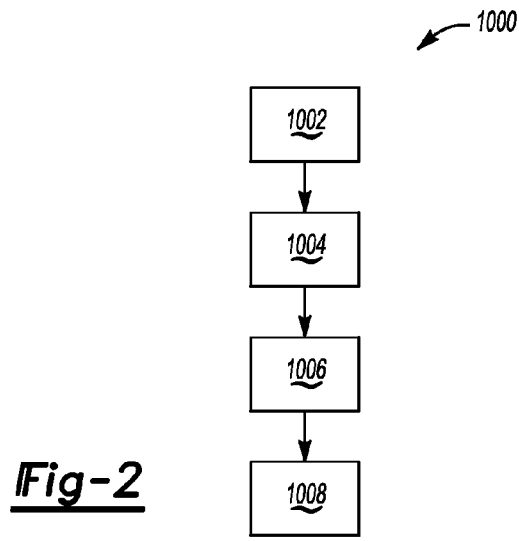
FIG. 2 is a schematic flowchart of a method of updating efficiency of a selective catalytic reduction filter of the exhaust treatment system of the vehicle.

Referring to FIG. 2, the present disclosure provides a method 1000 of updating efficiency of the SCRF 26 of the exhaust treatment system 18 of the vehicle 10. As such, the method 1000 updates the efficiency for one or more of the NOx model 60, the absorption model 62, the desorption model 64 and the oxidation model 66 as discussed above.

Figure 3:
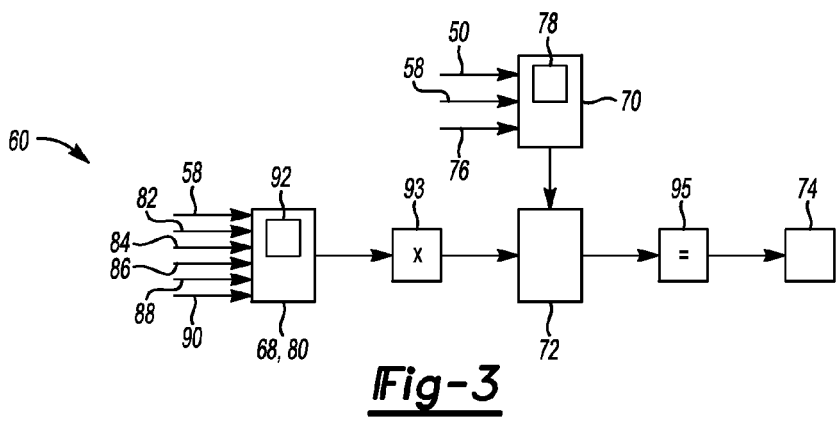
FIG. 3 is a schematic diagram of a NOx model.
Figure 4:
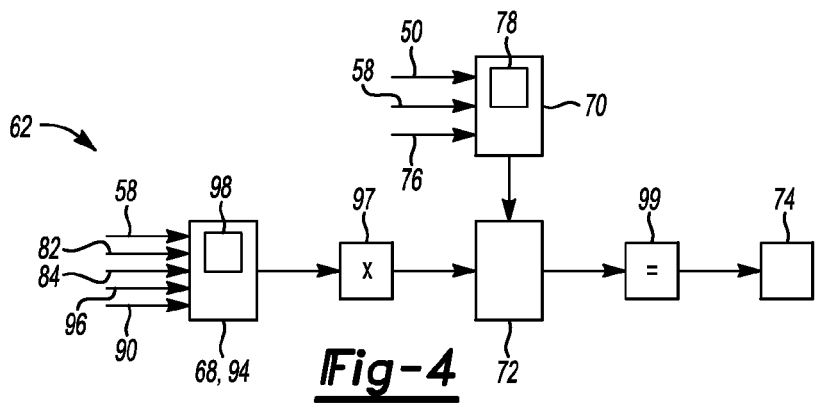
FIG. 4 is a schematic diagram of an absorption model.
Figure 5:
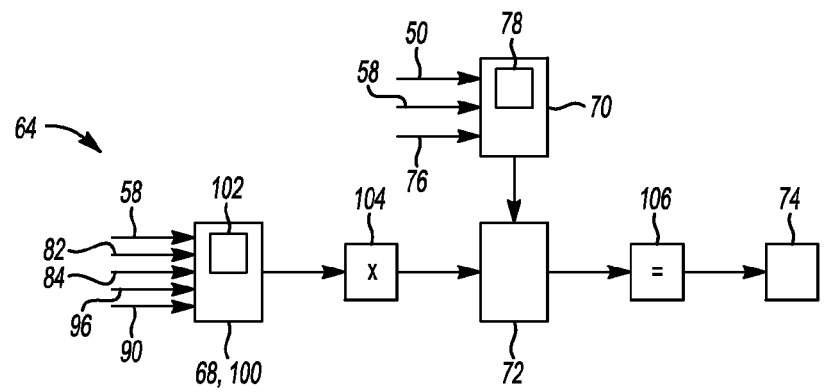
FIG. 5 is a schematic diagram of a desorption model.
Figure 6:
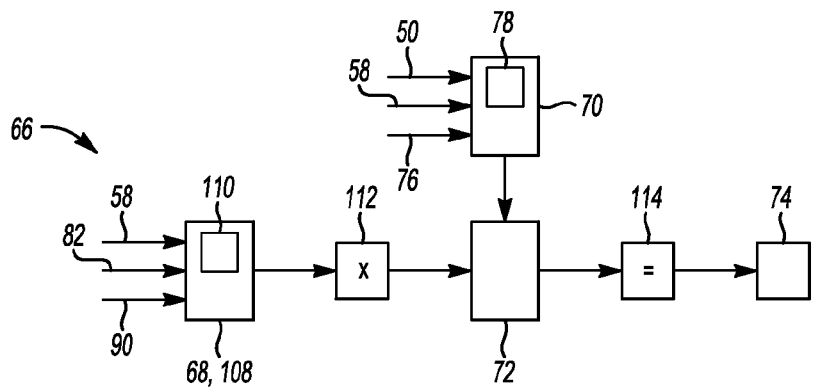
FIG. 6 is a schematic diagram of an oxidation model.

The method 1000 includes obtaining 1002 an initial calculated efficiency 68 of the SCRF 26, via the controller 42, regarding one of a NOx conversion, a reductant absorption, a reductant desorption and a reductant oxidation. In other words, the controller 42 obtains or collects the initial calculated efficiency 68 of the SCRF 26. The initial calculated efficiency 68 regarding the NOx conversion is illustrated in FIG. 3 in the NOx model 60. The initial calculated efficiency 68 regarding the reductant absorption is illustrated in FIG. 4 in the absorption model 62. The initial calculated efficiency 68 regarding the reductant desorption is illustrated in FIG. 5 in the desorption model 64. The initial calculated efficiency 68 regarding the reductant oxidation is illustrated in FIG. 6 in the oxidation model 66. The initial calculated efficiency 68 can be calculated using numeric data obtained either through empirical testing or through analytic formulation which is discussed further below.

The method 1000 also includes determining 1004 a soot mass estimate 70 in the SCRF 26 representative of an amount of soot collected inside the SCRF 26 and determining 1006 a soot correction factor 72 from the soot mass estimate 70. The method 1000 further includes calculating 1008, via the controller 42, an updated efficiency value 74 of the SCRF 26 by multiplying the soot correction factor 72 and the initial calculated efficiency 68 to update the efficiency of the SCRF 26, i.e., to obtain an updated efficiency of the SCRF 26. An amount of the reductant 30 being passed into the exhaust stream 14 can be adjusted based on the updated efficiency of the SCRF 26. It is to be appreciated that the controller 42 can store one or more of the mathematical calculations of FIGS. 3-6 to update the desired efficiency of the SCRF 26 as discussed further below.

The soot mass estimate 70 in the SCRF 26 can be determined by utilizing various inputs. One of the inputs that can be utilized is the pressure difference 50 across the SCRF 26. Another one of the inputs that can be utilized is the temperature 58 of the substrate 34 of the SCRF 26. Another one of the inputs that can be utilized is a total time 76 since a thermal regeneration being performed to the SCRF 26. If more than one thermal regeneration has been performed to the SCRF 26, the total time 76 is from the last thermal regeneration performed to the SCRF 26.

Therefore, in certain embodiments, determining 1004 the soot mass estimate 70 in the SCRF 26 can include determining the pressure difference 50 across the SCRF 26. Furthermore, in certain embodiments, determining 1004 the soot mass estimate 70 in the SCRF 26 can include determining the temperature 58 of the substrate 34 of the SCRF 26. Additionally, in certain embodiments, determining 1004 the soot mass estimate 70 in the SCRF 26 can include determining the total time 76 since the thermal regeneration being performed to the SCRF 26. As such, determining 1004 the soot mass estimate 70 in the SCRF 26 can include selecting a first numeric value from a look-up table 78 based on at least one of the pressure difference 50 across the SCRF 26, the temperature 58 of the substrate 34 and the total time 76 since the thermal regeneration. Selecting the first numeric value from the look-up table 78 based on at least one of the pressure difference 50, the temperature 58 of the substrate 34 and the total time 76 since the thermal regeneration should be construed to include non-exclusive logical "or", i.e., at least one of the pressure difference 50 across the SCRF 26 or the temperature 58 of the substrate 34 of the SCRF 26 or the total time 76 since the last thermal regeneration performed to the SCRF 26 or combinations thereof, which are discussed further below. Furthermore, it is to be appreciated that other inputs can be utilized to determine the soot mass estimate 70, such as for example, pressures, NOx levels, the total miles the vehicle 10 has traveled, time, etc. As indicated above, it is to be appreciated that the one or a combination of more than one of the pressure difference 50 across the SCRF 26, the temperature 58 of the substrate 34 of the SCRF 26, the total time 76 since the last thermal regeneration performed to the SCRF 26, etc., can be utilized to determine the soot mass estimate 70. It is to be appreciated that the look-up table 78 can be populated using numeric data obtained either through empirical testing or through analytic formulation. In certain embodiments, the soot mass estimate 70 can be a value expressed in grams of soot.

The initial calculated efficiency 68 can be inputted into various models 60, 62, 64, 66 as discussed above. Each of the models 60, 62, 64, 66 are discussed in turn below.

Referring to FIG. 3, for the NOx model 60, the initial calculated efficiency 68 is further defined as one of an initial NOx conversion efficiency 80 representing the ability of the SCRF 26 to catalytically convert constituents in the exhaust stream 14 into inert byproducts regarding the NOx conversion. For example, various inputs can be utilized to obtain the initial calculated efficiency 68 of the NOx conversion. One of the inputs that can be utilized is the temperature 58 of the substrate 34 of the SCRF 26. Another one of the inputs that can be utilized is an exhaust flow rate 82 through the SCRF 26. In other words, the flow rate of the exhaust gas stream 14 through the SCRF 26. Yet another one of the inputs that can be utilized is an amount of reductant stored 84 on the washcoat 36 of the substrate 34 of the SCRF 26. Yet another one of the inputs that can be utilized is a maximum reductant storage capacity 86 of the washcoat 36 of the substrate 34 of the SCRF 26. Yet another one of the inputs that can be utilized is a NOx flow rate 88 through the SCRF 26. In other words, the flow rate of NOx gases through the SCRF 26. Yet another one of the inputs that can be utilized is the amount of ash accumulated 90 inside the SCRF 26. One or more of these inputs can be utilized by the controller 42 to determine or obtain the initial NOx conversion efficiency 80. Therefore, one or more of these inputs can be utilized by a NOx map 92 to output the initial NOx conversion efficiency 80. The NOx map 92 can use data obtained either through empirical testing or through analytic formulation. As such, for the NOx model 60, obtaining 1002 the initial calculated efficiency 68 of the SCRF 26 can include determining one or more of the inputs discussed for this model 60. Furthermore, in the embodiment of FIG. 3, calculating 1008 the updated efficiency value 74 of the SCRF 26 can include calculating, via the controller 42, the updated efficiency value 74 by multiplying the soot correction factor 72 with the initial NOx conversion efficiency 80 to update the efficiency of the NOx conversion. Simply stated, the initial NOx conversion efficiency 80 is multiplied (box 93) by the soot correction factor 72 to equal (box 95) the updated efficiency value 74 for the NOx conversion.

Referring to FIG. 4, for the absorption model 62, the initial calculated efficiency 68 is further defined as an initial reductant absorption efficiency 94 representing the ability to absorb the reductant 30 on the substrate 34 of the SCRF 26 regarding the reductant absorption. For example, various inputs can be utilized to obtain the initial calculated efficiency 68 of the reductant absorption. One of the inputs that can be utilized is the temperature 58 of the substrate 34 of the SCRF 26. Another one of the inputs that can be utilized is the exhaust flow rate 82 through the SCRF 26. In other words, the flow rate of the exhaust gas stream 14 through the SCRF 26. Yet another one of the inputs that can be utilized is the amount of reductant stored 84 on the washcoat 36 of the substrate 34 of the SCRF 26. Yet another one of the inputs that can be utilized is an injection rate 96 of the reductant 30 into the exhaust stream 14. Yet another one of the inputs that can be utilized is the amount of ash accumulated 90 inside the SCRF 26. One or more of these inputs can be utilized by the controller 42 to determine or obtain the initial reductant absorption efficiency 94. Therefore, one or more of these inputs can be utilized by an absorption map 98 to output the initial reductant absorption efficiency 94. The absorption map 98 can use data obtained either through empirical testing or through analytic formulation. As such, for the absorption model 62, obtaining 1002 the initial calculated efficiency 68 of the SCRF 26 can include determining one or more of the inputs discussed for this model 62. Furthermore, in the embodiment of FIG. 4, calculating 1008 the updated efficiency value 74 of the SCRF 26 can include calculating, via the controller 42, the updated efficiency value 74 by multiplying the soot correction factor 72 with the initial reductant absorption efficiency 94 to update the efficiency of the reductant absorption. Simply stated, the initial reductant absorption efficiency 94 is multiplied (box 97) by the soot correction factor 72 to equal (box 99) the updated efficiency value 74 for the reductant absorption.

Referring to FIG. 5, for the desorption model 64, the initial calculated efficiency 68 is further defined as an initial reductant desorption efficiency 100 representing an amount of the reductant 30 passing through the SCRF 26 regarding the reductant desorption. For example, various inputs can be utilized to obtain the initial calculated efficiency 68 of the reductant desorption. One of the inputs that can be utilized is the temperature 58 of the substrate 34 of the SCRF 26. Another one of the inputs that can be utilized is the exhaust flow rate 82 through the SCRF 26. In other words, the flow rate of the exhaust gas stream 14 through the SCRF 26. Yet another one of the inputs that can be utilized is the amount of reductant stored 84 on the washcoat 36 of the substrate 34 of the SCRF 26. Yet another one of the inputs that can be utilized is the injection rate 96 of the reductant 30 into the exhaust stream 14. Yet another one of the inputs that can be utilized is the amount of ash accumulated 90 inside the SCRF 26. One or more of these inputs can be utilized by the controller 42 to determine or obtain the initial reductant desorption efficiency 100. Therefore, one or more of these inputs can be utilized by a desorption map 102 to output the initial reductant desorption efficiency 100. The desorption map 102 can use data obtained either through empirical testing or through analytic formulation. As such, for the desorption model 64, obtaining 1002 the initial calculated efficiency 68 of the SCRF 26 can include determining one or more of the inputs discussed for this model 64. Furthermore, in the embodiment of FIG. 5, calculating 1008 the updated efficiency value 74 of the SCRF 26 can include calculating, via the controller 42, the updated efficiency value 74 by multiplying the soot correction factor 72 with the initial reductant desorption efficiency 100 to update the efficiency of the reductant desorption. Simply stated, the initial reductant desorption efficiency 100 is multiplied (box 104) by the soot correction factor 72 to equal (box 106) the updated efficiency value 74 for the reductant desorption.

Referring to FIG. 6, for the oxidation model 66, the initial calculated efficiency 68 is further defined as an initial oxidation efficiency 108 representing the ability to oxidize the reductant 30 through the SCRF 26 regarding the reductant oxidation. For example, various inputs can be utilized to obtain the initial calculated efficiency 68 of the reductant oxidation. One of the inputs that can be utilized is the temperature 58 of the substrate 34 of the SCRF 26. Another one of the inputs that can be utilized is the exhaust flow rate 82 through the SCRF 26. In other words, the flow rate of the exhaust gas stream 14 through the SCRF 26. Yet another one of the inputs that can be utilized is the amount of ash accumulated 90 inside the SCRF 26. One or more of these inputs can be utilized by the controller 42 to determine or obtain the initial oxidation efficiency 108. Therefore, one or more of these inputs can be utilized by an oxidation map 110 to output the initial oxidation efficiency 108. The oxidation map 110 can use data obtained either through empirical testing or through analytic formulation. As such, for the oxidation model 66, obtaining 1002 the initial calculated efficiency 68 of the SCRF 26 can include determining one or more of the inputs discussed for this model 66. Furthermore, in the embodiment of FIG. 6, calculating 1008 the updated efficiency value 74 of the SCRF 26 can include calculating, via the controller 42, the updated efficiency value 74 by multiplying the soot correction factor 72 with the initial oxidation efficiency 108 to update the efficiency of the reductant oxidation. Simply stated, the initial oxidation efficiency 108 is multiplied (box 112) by the soot correction factor 72 to equal (box 114) the updated efficiency value 74 for the reductant oxidation.

The soot correction factor 72 can be a first numeric value of less than 1.0. Therefore, determining 1004 the soot mass estimate 70 can include selecting the first numeric value from the look-up table 78. The look-up table 78 expresses the soot correction factor 72 as a function of the amount of soot inside the SCRF 26. Generally, the soot correction factor 72 decreases as the amount of soot increases inside the SCRF 26. After a thermal regeneration is performed to the SCRF 26, generally, the amount of soot inside the SCRF 26 returns to approximately zero. As such, soot will again accumulate inside the SCRF 26 until the next thermal regeneration. This thermal regeneration cycle continues throughout the life of the vehicle 10. Immediately before a thermal regeneration is performed, the first numeric value of the soot correction factor 72 is less than what the first numeric value of the soot correction factor 72 is immediately after a thermal regeneration is performed.

In one embodiment, the soot correction factor 72 has different numeric values for at least one of the NOx conversion, the reductant absorption, the reductant desorption and the reductant oxidation. The different numeric values for at least one of the NOx conversion, the reductant absorption, the reductant desorption and the reductant oxidation should be construed to include non-exclusive logical "or", i.e., the NOx conversion or the reductant absorption or the reductant desorption or the reductant oxidation or combinations thereof. For example, the soot correction factor 72 can be a different value for each of the calculations to update the different efficiencies. In other words, the soot correction factor 72 can be a first value to update the efficiency for the NOx conversion, a second value different from the first value to update the efficiency for the reductant absorption, a third value different from the first and second values to update the efficiency for the reductant desorption and a fourth value different from the first, second and third values to update the efficiency for the reductant oxidation. As another example, the soot correction factor 72 can be the same value to update two of the efficiencies and different values to update the remaining two efficiencies. As yet another example, the soot correction factor 72 can be the same value to update three of the efficiencies and a different value to update the remaining one efficiency. In another embodiment, the soot correction factor 72 is the same numeric value to update each of the NOx conversion, the reductant absorption, the reductant desorption and the reductant oxidation.

It is to be appreciated that the order or sequence of performing the method 1000 as identified in the flowchart of FIG. 2 is for illustrative purposes and other orders or sequences are within the scope of the present disclosure. It is to also be appreciated that the method 1000 can include other features not specifically identified in the flowchart of FIG. 2.

While the best modes for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of updating an efficiency of a selective catalytic reduction filter (SCRF) of an exhaust treatment system of a vehicle, the method comprising:
   obtaining an initial calculated efficiency of the SCRF, via a controller, regarding one of a NOx conversion, a reductant absorption, a reductant desorption and a reductant oxidation;
   determining a soot mass estimate in the SCRF representative of an amount of soot collected inside the SCRF;
   determining a soot correction factor from the soot mass estimate;
   calculating, via the controller, an updated efficiency value of the SCRF by multiplying the soot correction factor and the initial calculated efficiency to obtain an updated efficiency of the SCRF; and
   adjusting an amount of reductant being passed into an exhaust stream based on the updated efficiency of the SCRF.

2. A method as set forth in claim 1 wherein determining the soot mass estimate in the SCRF includes determining a pressure difference across the SCRF.

3. A method as set forth in claim 2 wherein determining the soot mass estimate in the SCRF includes determining a temperature of a substrate of the SCRF.

4. A method as set forth in claim 3 wherein determining the soot mass estimate in the SCRF includes determining a total time since a thermal regeneration has been performed on the SCRF.

5. A method as set forth in claim 4 wherein determining the soot mass estimate in the SCRF includes selecting a first numeric value from a look-up table based on at least one of the pressure difference across the SCRF, the temperature of the substrate and the total time since the thermal regeneration.

6. A method as set forth in claim 1 wherein the initial calculated efficiency is further defined as one of an initial NOx conversion efficiency representing the ability of the SCRF to catalytically convert constituents in an exhaust stream into inert byproducts regarding the NOx conversion, an initial reductant absorption efficiency representing the ability to absorb a reductant on a substrate of the SCRF regarding the reductant absorption, an initial reductant desorption efficiency representing an amount of the reductant passing through the SCRF regarding the reductant desorption and an initial oxidation efficiency representing the ability to oxidize the reductant through the SCRF regarding the reductant oxidation.

7. A method as set forth in claim 6 wherein calculating the updated efficiency value of the SCRF includes calculating, via the controller, the updated efficiency value by multiplying the soot correction factor with the initial NOx conversion efficiency to update the efficiency of the NOx conversion.

8. A method as set forth in claim 6 wherein calculating the updated efficiency value of the SCRF includes calculating, via the controller, the updated efficiency value by multiplying the soot correction factor with the initial reductant absorption efficiency to update the efficiency of the reductant absorption.

9. A method as set forth in claim 6 wherein calculating the updated efficiency value of the SCRF includes calculating, via the controller, the updated efficiency value by multiplying the soot correction factor with the initial reductant desorption efficiency to update the efficiency of the reductant desorption.

10. A method as set forth in claim 6 wherein calculating the updated efficiency value of the SCRF includes calculating, via the controller, the updated efficiency value by multiplying the soot correction factor with the initial oxidation efficiency to update the efficiency of the reductant oxidation.

11. A method as set forth in claim 6 wherein the soot correction factor has different numeric values for at least one of the NOx conversion, the reductant absorption, the reductant desorption and the reductant oxidation.

12. A method as set forth in claim 6 wherein the soot correction factor is the same numeric value for each of the NOx conversion, the reductant absorption, the reductant desorption and the reductant oxidation.

13. A method as set forth in claim 1 wherein the soot correction factor is a first numeric value of less than 1.0, and wherein the soot correction factor decreases as the amount of soot increases inside the SCRF.

14. A method as set forth in claim 13 wherein determining the soot mass estimate includes selecting the first numeric value from a look-up table, with the look-up table expressing the soot correction factor as a function of the amount of soot inside the SCRF.

15. A vehicle comprising:
   an engine that generates an exhaust stream during operation;
   an exhaust treatment system coupled to the engine and including:
      a selective catalytic reduction filter (SCRF) to catalytically convert constituents in the exhaust stream into inert byproducts and to filter particulate matter from the exhaust stream;
      a controller in communication with the SCRF, with the controller including a processor and a memory having recorded instructions for updating an efficiency of the SCRF of the exhaust treatment system, wherein the controller is configured to:
         obtain an initial calculated efficiency of the SCRF regarding one of a NOx conversion, a reductant absorption, a reductant desorption and a reductant oxidation;
         determine a soot mass estimate in the SCRF representative of an amount of soot collected inside the SCRF;
         determine a soot correction factor from the soot mass estimate; and
         calculate an updated efficiency value of the SCRF by multiplying the soot correction factor and the initial calculated efficiency to update the efficiency of the SCRF.

16. A vehicle as set forth in claim 15 wherein the initial calculated efficiency is further defined as one of an initial NOx conversion efficiency representing the ability of the SCRF to catalytically convert constituents in the exhaust stream into inert byproducts regarding the NOx conversion, an initial reductant absorption efficiency representing the ability to absorb a reductant on a substrate of the SCRF regarding the reductant absorption, an initial reductant desorption efficiency representing an amount of reductant passing through the SCRF regarding the reductant desorption and an initial oxidation efficiency representing the ability to oxidize the reductant through the SCRF regarding the reductant oxidation.

17. A vehicle as set forth in claim 16 wherein the controller being configured to calculate the updated efficiency value of the SCRF is further defined as the controller being configured to calculate the updated efficiency value by multiplying the soot correction factor with the initial NOx conversion efficiency to update the efficiency of the NOx conversion.

18. A vehicle as set forth in claim 16 wherein the controller being configured to calculate the updated efficiency value of the SCRF is further defined as the controller being configured to calculate the updated efficiency value by multiplying the soot correction factor with the initial reductant absorption efficiency to update the efficiency of the reductant absorption.

19. A vehicle as set forth in claim 16 wherein the controller being configured to calculate the updated efficiency value of the SCRF is further defined as the controller being configured to calculate the updated efficiency value by multiplying the soot correction factor with the initial reductant desorption efficiency to update the efficiency of the reductant desorption.

20. A vehicle as set forth in claim 16 wherein the controller being configured to calculate the updated efficiency value of the SCRF is further defined as the controller being configured to calculate the updated efficiency value by multiplying the soot correction factor with the initial oxidation efficiency to update the efficiency of the reductant oxidation.

\* \* \* \* \*